Dec. 22, 1931. A. BOSCHÉ 1,837,894
LUMINOUS ADVERTISING DEVICE
Filed Nov. 4, 1929   4 Sheets-Sheet 1
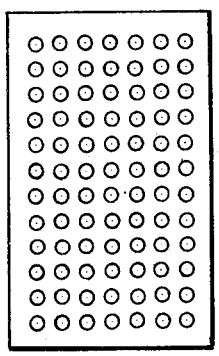
Fig.1.
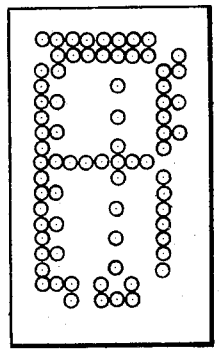
Fig.2.
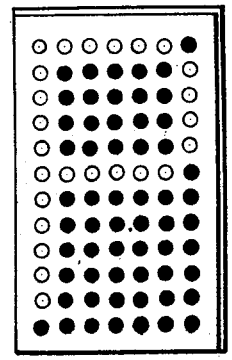
Fig.3.
Fig.4.
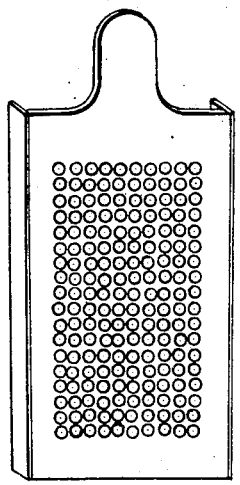
Fig.5.
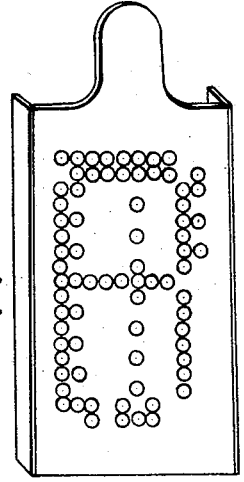
Fig.6.
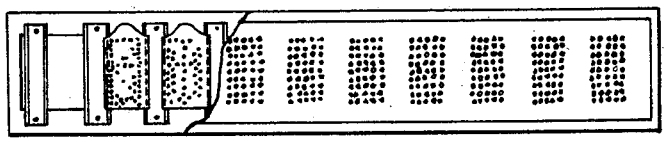
Fig.7
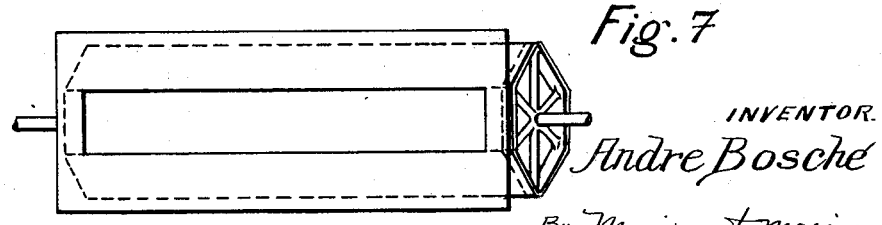
INVENTOR.
André Bosché
By Marion + Marion
Attorneys.

Dec. 22, 1931.   A. BOSCHÉ   1,837,894
LUMINOUS ADVERTISING DEVICE
Filed Nov. 4, 1929   4 Sheets-Sheet 2
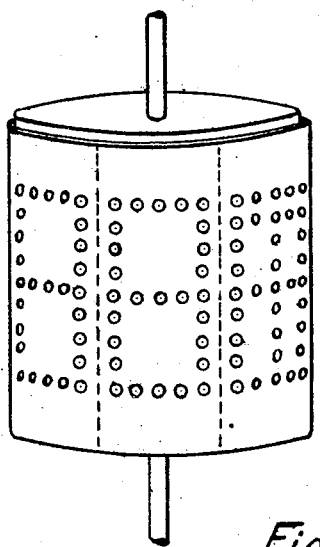
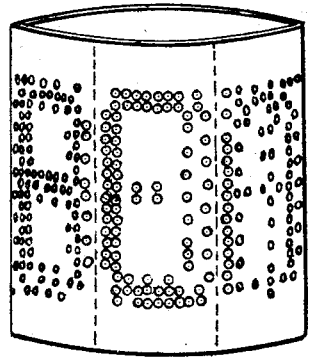
*Fig. 8.*   *Fig. 9.*
*Fig. 10.*
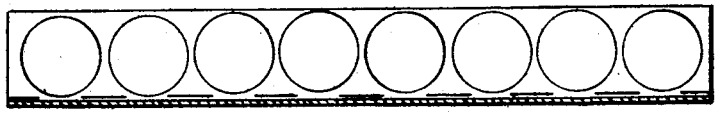
INVENTOR.
Andre Bosché.
By Maxim & Marion
Attorneys.

Dec. 22, 1931.         A. BOSCHÉ              1,837,894
              LUMINOUS ADVERTISING DEVICE
              Filed Nov. 4, 1929    4 Sheets-Sheet 3

INVENTOR.
André Bosché
By Mauro Mauro
Attorneys.

Dec. 22, 1931.  A. BOSCHÉ  1,837,894
LUMINOUS ADVERTISING DEVICE
Filed Nov. 4, 1929  4 Sheets-Sheet 4

INVENTOR
Andre Bosché.

By Marion +Marion
Attorneys.

Patented Dec. 22, 1931

1,837,894

UNITED STATES PATENT OFFICE

ANDRÉ BOSCHÉ, OF PARIS, FRANCE, ASSIGNOR TO SOCIETE APPAREILS LUMINEUX ANNONCIATEURS ET SIGNALISATEURS, OF PARIS, FRANCE

LUMINOUS ADVERTISING DEVICE

Application filed November 4, 1929, Serial No. 404,813, and in France November 10, 1928.

The present invention relates to devices for the production of luminous, interchangeable advertisements by means of several perforated plates, generally disposed one behind the other and displaceable relatively to each other.

According to the invention a glass plate is disposed at a given adjustable distance from the perforated plates, this glass plate being provided with small pointed pyramids, a certain number of which corresponds to each of the holes in the perforated plates, and which serves as a projecting screen for luminous rays traversing the perforated plates. Furthermore, a ground glass is used to distribute the light in a uniform manner and disposed on the face of the glass turned toward the source of light.

In this way, different luminous beams are obtained, which traversing the holes of the perforated plates, appear on the glass plate, used for a screen, as luminous stripes connected to each other and forming letters or signs which it is desired to represent. The shape of the tracing of the sign or of the letter to be represented can be varied by simply varying the distance between the glass plate and the perforated plates. The projections of the glass plate are of pyramidal shape and the surface, at the basis of the pyramid sides must be chosen as small as possible, so that the number of sides or facets, covering a hole of the perforated plate, is as great as possible.

A glass plate so designed and serving as screen, produces a luminous sign neatly traced and hence easily recognizable.

Furthermore, one of the plates is, according to the invention, covered with opaque paper stuck thereto and perforated according to the letters and signs to be represented. Such an arrangement permits modification, at any moment and in a simple and economical way, of the different plates to represent different letters by means of the same plate.

A further advantage of such an arrangement consists in that the plates can be perfectly uniform, since they do not act as supports, and they can be manufactured similar to each other, whereby the manufacturing costs are considerably reduced. It is also possible to employ colored paper at will, and the advertisements can be adapted in this simple way to varying conditions and requirements.

In the drawings appended:

Figs. 1 to 3 explain the principle common to all embodiments,

Fig. 4 relates to the first embodiment,

Figs. 5 and 6 to the second embodiment,

Fig. 7 to the third embodiment, and

Figs. 8, 9 and 10 to the fourth embodiment of the invention.

Figs. 11 to 17 relate to the application of a glass with pyramidal facets as a transparent screen, and Fig. 18 shows a preferred embodiment of the invention.

Fig. 2 represents a plate carrying the letters B, C, P, O, represented by the perforations.

These letters appear successively (Fig. 3) at the time another plate called the grate (Fig. 1) is displaced upon the first according to a predetermined movement.

The first executional means is common to all embodiments, in a general way.

These means consist of a uniformly perforated plate (Fig. 4) having pasted to one side an opaque paper, whereupon only the required perforations are punched by suitable means, according to the letters or signs to be represented.

Such an arrangement permits modification of the signs and letters at will and in a simple and economical way; to represent all possible signs and letters with the aid of one and the same plate.

The device presents furthermore the advantage that the plates do not serve as supports and are all similar to each other, whereby they are manufactured at reduced costs.

The second embodiment (Fig. 6) comprises plates placed side by side in a frame (Fig. 5) having guides permitting their removal and replacing in order to establish a new wording.

The third embodiment (Fig. 7) comprises a polygonal drum movable on an axle and supporting at each of its faces a single set of plates having the length of the drum; the luminous source is placed within the drum.

The fourth embodiment comprises two perforated plates forming preferably cylindrical envelopes disposed concentrically within each other and displaceable axially either together or separately, by suitable means; the luminous source being disposed within the drum or cylinders.

Fig. 8 represents the two cylinders pushed over each other.

Fig. 9 shows the inner cylinder removed from the outer one. The circumference of the inner cylinder is divided into 7 or 8 parts, each part comprising a certain number of signs (on the whole at least 37) so as to represent the letters of the alphabet, the numbers and the signs of punctuation.

The outer cylinder serving as a grate, (Fig. 8) is divided in as many parts as the inner cylinder. Each division of this grate is perforated according to a device especially appropriate to the signs to be represented.

This device can consist of a single cylinder movable on an axle, in front of a fixed grate reduced to the dimension of one division, and used as a grate common to all divisions of the cylinder.

In this case, the plate instead of being cylindrical can form a hollow polygonal prism. In order to permit the rotation of this prism, the common grate is slightly removed at the moment of the rotation of the prism.

Fig. 10 represents a grouping of several described devices permitting to form a sentence at will, by mechanical or electrical attachment of these different devices to a controlling key-board.

Figs. 11 to 17 refer to the utilization of glasses with pyramidal points as a screen for the apparatus described above.

Figure 15:
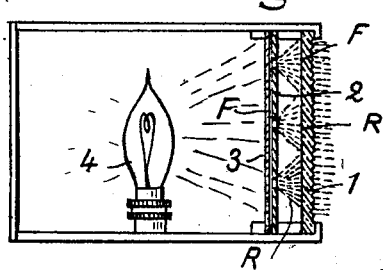

In Fig. 15, 1 represents the glass with pyramidal points, used as a screen, 2 is the perforated plate, and 3 a ground glass placed behind the plate 2. Instead of the plate 3 any translucid surface, eventually a coloured one, may be used, 4 represents the luminous source the light of which is diffused by the plate 3 distributing the same uniformly upon the rear face of the plate 2, so as to ensure an equal intensity to the luminous pencils constituted by each perforation and blended the opposite side of 1 by the pyramidal points.

The points of the glass 1 are directed outwardly so as to direct the beams horizontally and parallely, as across a prism, by each point of the glass screen.

Figure 16:
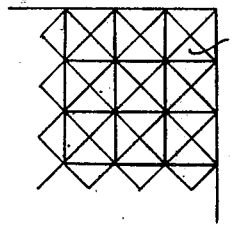
Figure 17:
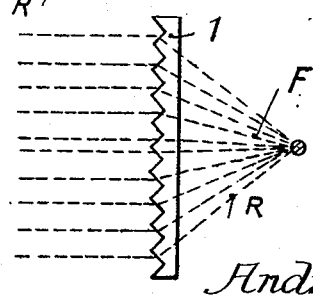

According to Figures 15 to 17 the outer diverging rays R of each beam F encounter, as visible in the drawings, the neighbouring luminous beam on the screen; owing to this encounter, the distances between the perforations disappear and there appear as many luminous zones, regular and of quadrangular aspect, as perforations on the plate 2.

Figure 11:
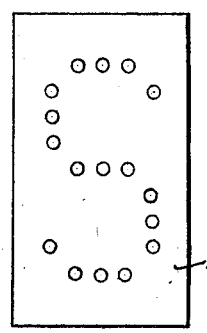
Figure 12:
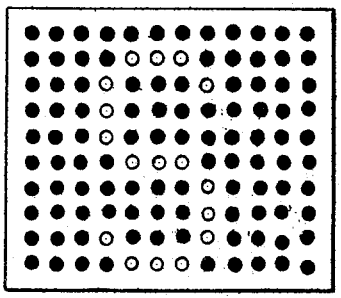
Figure 13:
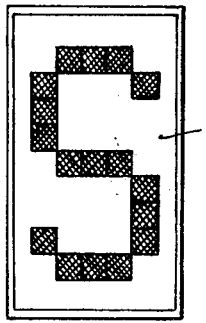

The perforations of the plates of Fig. 11 do not, therefore, appear as insulated circular points but, as shown in Fig. 13, as plain luminous, magnified, regular and well defined zones.

These zones touch each other and ensure in this way a continuity of the tracing of the sign or letter, imparting to same an original and pleasant form (Fig. 13).

Figure 14:
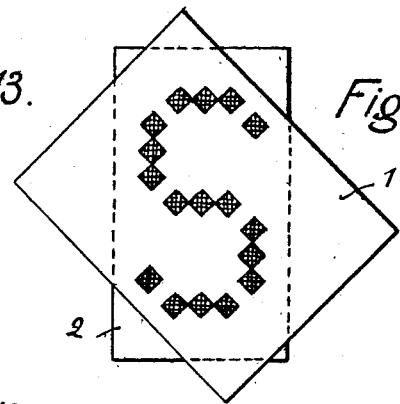

According to Fig. 14 the direction of the webs separating the glass-points is adapted to be displaced; owing to this movement, it is possible to obtain deformable signs giving the impression of moving signs.

Figure 18:
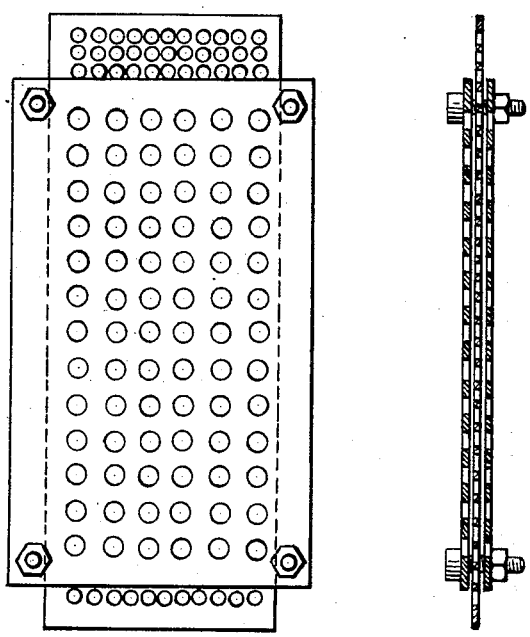

Fig. 18 represents a preferred fitting of the plate shown in Fig. 2 carrying the signs which shall appear. This plate is disposed in a duct formed by two plates uniformly perforated, as shown in Figs. 1 and 4, the perforations of both plates corresponding to each other. This arrangement prevents infiltrations of light across the perforations not used and between the sign carrying plate and the perforated plate when looking at the signs at a certain angle, instead of looking in front of the signs.

The invention extends also to the utilization of glass with pyramidal points to all kind of existing advertising devices, with or without perforations, in order to obtain the advantages specified above.

What I claim, is:

1. In advertising devices plates having perforations placed behind each other, a light source to send light through said perforations, a glass plate to serve as projecting screen for the luminous beams traversing said perforations, reflecting pyramidical points on the outer surface of the glass plate, and a ground glass disc directly in front of the luminous source, the formation of all signs being effected by displacement of the perforated plates situated behind each other, relative to each other.

2. In advertising devices universally perforated plates placed behind each other, a light source, a ground glass between the light source and the perforated plates, means to displace the perforated plates relative to each other, a glass plate in front of the said perforated plates having a multitude of points directed outwardly, and an opaque member before one of the cooperating perforated plates and perforated according to the sign to be represented.

3. In advertising devices, two universally perforated plates spaced from each other, a light source, a ground glass between the light source and the perforated plates a glass plate in front of said plates used as a viewing screen and having a multitude of pyramidal points directed outwardly, and a plate within the said spaced plates and carrying the design to appear on the glass screen, whereby light filtrations between the plates and design plate are avoided when looking obliquely at the device.

In witness whereof I have hereunto set my hand.

ANDRÉ BOSCHÉ.